Patented Feb. 2, 1954

2,668,179

UNITED STATES PATENT OFFICE 2,668,179

LINEAR DODECAMETHYLTETRAPHOSPHORAMIDE

Henry Tolkmith, Midland, Mich., assignor to The Dow Chemical Company, Midland, Mich., a corporation of Delaware No Drawing. Application November 10, 1952,
Serial No. 319,787

1 Claim. (Cl. 260—545)

The present invention is concerned with a new linear dodecamethyltetraphosphoramide of the formula

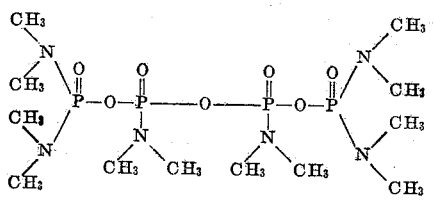

This compound is an oily liquid somewhat soluble in many organic solvents and water. It is of value as a toxic constituent of parasiticide compositions and as an intermediate for the preparation of more complex phosphorus derivatives.

The new compound may be prepared by several methods. One method comprising reacting 2 molecular proportions of dimethyl amine with 1 molecular proportion of tetramethyldiamidophosphoryl phosphoric dichloride of the formula

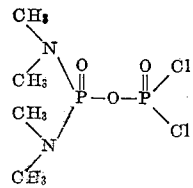

to displace one chlorine in the dichloride reactant and prepare an intermediate tetramethyldiamidophosphoric chlorodimethylamidophosphoric anhydride of the formula

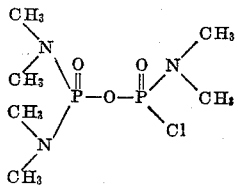

This latter intermediate compound is then reacted with water.

In carrying out the first phase of the reaction, the tetramethyldiamidophosphoryl phosphoric dichloride is dispersed in a non-polar organic solvent such as xylene, toluene or benzene and gaseous dimethylamine added portionwise thereto with stirring. The reaction proceeds smoothly at the temperature range of from about —5° to 85° C. The reaction is somewhat exothermic and the temperature may be controlled by the addition and subtraction of heat, as required. Following the reaction, the reaction mixture may be filtered to separate dimethylamine hydrochloride and the filtrate distilled under reduced pressure to separate low boiling constituents and to obtain as a residue the tetramethyldiamidophosphoric chlorodimethylamidophosphoric anhydride intermediate. Since the intermediate has a tendency to decompose at temperatures in excess of about 110° C., distillation temperatures in excess of 110° C. for any appreciable period of time should be avoided.

In the second phase of the reaction, the intermediate tetramethyldiamidophosphoric chlorodimethylamidophosphoric anhydride and water are reacted together in an organic solvent such as that employed in the first phase of the reaction and in the presence of sufficient of a tertiary amine such as pyridine to act as acceptor for by-product hydrogen chloride. The reaction takes place smoothly at the temperature range of from about 30° to 100° C. In carrying out the reaction, good results are obtained when about 2 mols of the tetramethyldiamidophosphoric chlorodimethylamidophosphoric anhydride reactant and 2 moles of pyridine are employed with each mole of water. Upon completion of the reaction, the reaction mixture is filtered to separate amine hydrochloride and the filtrate distilled under reduced pressure and under 135° C. to separate low boiling constituents and to obtain as a residue the desired linear dodecamethyltetraphosphoramide.

In another method, the new compound may be prepared by mixing or otherwise blending tetramethyldiamidophosphoric chloride with a bis-(O-alkyl dimethylamidophosphoric) anhydride of the formula

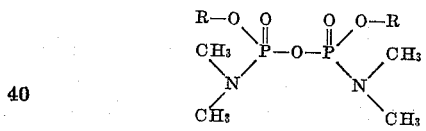

wherein R is a lower alkyl radical. The mixture is then heated at a temperature of from about 90° to 135° C. whereby by-product alkyl chloride is evolved (RCl), the heating being continued until the evolution of alkyl chloride of reaction is substantially complete. Since the desired product is somewhat unstable at temperatures in excess of 135° C., reaction temperatures substantially in excess of 135° C. for any appreciable period of time should be avoided. In practice, good results are obtained when employing about 2 moles of the tetramethyldiamidophosphoric chloride per mole of the anhydride reactant. If desired, the reaction may be carried out in an inert organic solvent such as toluene, xylene and chlorobenzene. Following the reaction, the mixture may be distilled under reduced pressure to separate low boiling constituents and to obtain as a residue the desired product.

The following examples illustrate the invention but are not to be construed as limiting:

*Example 1*

17.1 grams (0.1 mole) of tetramethyldiamidophosphoric dichloride and 14.4 grams (0.05 mole) of bis(O-ethyl dimethylamidophosphoric) anhydride were mixed together and the resulting dispersion heated at about 130° C. until the evolution of ethyl chloride of reaction was substantially complete. The heating was carried out with stirring and over a period of about 2 hours. During the heating, ethyl chloride was separated and recovered from the reaction zone substantially as formed. Following the reaction, the reaction mixture was distilled under reduced pressure at gradually increasing temperatures up to a temperature of 130° C. to separate low boiling constituents and to obtain as a residue a linear dodecamethyltetraphosphoramide product. The latter was an oily liquid having a density of 1.2561 at 20° C. and a refractive index $n/D$ of 1.4719 at 20° C.

*Example 2*

14.9 grams (0.331 mole) of dimethylamine was added portionwise with cooling to 49.2 grams of a product containing 91 percent by weight of tetramethyldiamidophosphoryl phosphoric dichloride (equivalent to 0.165 mole of the dichloride compound) dissolved in 200 milliliters of benzene. The addition was carried out with stirring and at a temperature of from 5° to 10° C. Following the addition, the dimethylamine hydrochloride of reaction was separated by filtration to obtain a benzene solution of a tetramethyldiamidophosphoric chlorodimethylamidophosphoric anhydride intermediate.

A mixture of 12.5 grams (0.158 mole) of pyridine and 1.15 grams (0.064 mole) of water was then added to the above benzene solution of tetramethyldiamidophosphoric chlorodimethylamidophosphoric anhydride and the resulting mixture heated for one hour at the boiling temperature and under reflux. The reaction vessel and contents were then cooled to room temperature and the pyridine hydrochloride separated by filtration. The filtrate was then heated under reduced pressure at gradually increasing temperatures up to a temperature of 110° C. to separate low boiling constituents and to obtain the linear dodecamethyltetraphosphoramide product as a residue.

The tetraalkyldiamidophosphoryl phosphoric dichloride employed as a starting material as previously described, may be produced by the methods disclosed in my copending application Serial No. 242,405. This process comprises reacting together at a temperature of from 40° to 110° C. at least one molecular proportion of phosphorus oxychloride with one molecular proportion of O-alkyl tetramethyldiamidophosphate. The reaction involves a condensation resulting in the formation of an alkyl chloride (RCl).

In carrying out the reaction, the phosphorus oxychloride and O-alkyl tetramethyldiamidophosphate are mixed together and the resulting dispersion heated at a temperature of from 40° to 110° C. until no further substantial amounts of alkyl chloride of reaction are liberated. Upon completion of the reaction, the mixture may be distilled under reduced pressure and under 110° C. to separate low boiling constituents and to obtain as a residue the desired tetramethyldiamidophosphoryl phosphoric dichloride product. The latter is an oily liquid having a refractive index $n/D$ of 1.4669 at 20° C.

The new linear dodecamethyltetraphosphoramide compound has been found effective as a parasiticide and is adapted to be employed for the control of agricultural pests. In a representative operation, a 100 percent kill of two spotted spider mites was obtained with an aqueous spray composition containing 0.12 pound of the toxicant per 100 gallons of solution.

I claim:

Linear dodecamethyltetraphosphoramide of the formula

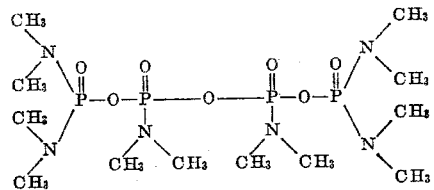

HENRY TOLKMITH.

No references cited.